United States Patent [19]

Chang et al.

[11] Patent Number: 4,902,588
[45] Date of Patent: Feb. 20, 1990

[54] ELECTROLYTE ADDITIVES TO IMPROVE VOLTAGE REGULATION IN THE LITHIUM-COPPER CHLORIDE RECHARGEABLE CELL

[75] Inventors: On-Kok Chang; John C. Hall, both of San Jose; Jeffrey Phillips, Saratoga; Lenard F. Silvester, Scotts Valley, all of Calif.

[73] Assignee: Altus Corporation, San Jose, Calif.

[21] Appl. No.: 202,265

[22] Filed: Jun. 6, 1988

[51] Int. Cl.⁴ .............................................. H01M 6/14
[52] U.S. Cl. ..................................... 429/50; 429/196; 429/199
[58] Field of Search ................ 429/196, 199, 101, 220, 429/50, 105, 194

[56] References Cited

U.S. PATENT DOCUMENTS

| | | | |
|---|---|---|---|
| 3,531,328 | 9/1970 | Bro et al. | 429/194 |
| 3,578,500 | 5/1971 | Maricle et al. | 429/194 X |
| 4,309,490 | 1/1982 | Chua et al. | 429/101 |
| 4,510,220 | 4/1985 | Gopikanth et al. | 429/194 X |

*Primary Examiner*—Anthony Skapars
*Attorney, Agent, or Firm*—Malcolm B. Wittenberg

[57] ABSTRACT

An electrochemical cell and method for improving voltage regulation of said cell. The cell employs lithium as an anode, lithium tetrachloroaluminate as an electrolyte, sulfur dioxide as a solvent, and high surface area carbon black containing cupric chloride as a cathode. Oxidizing agents such as halides and oxyhalides are employed to improve voltage regulation.

6 Claims, 2 Drawing Sheets

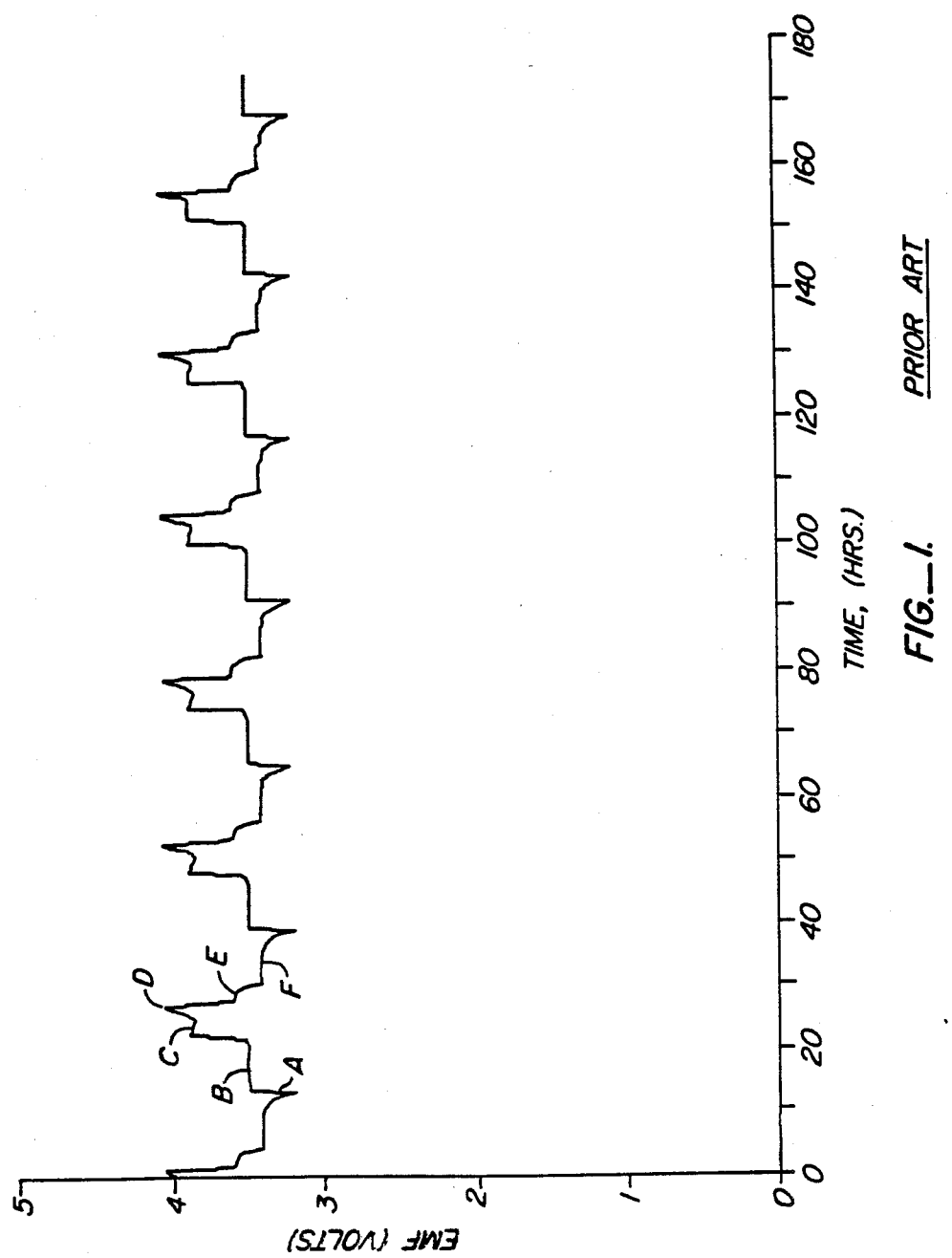
FIG._1.   PRIOR ART

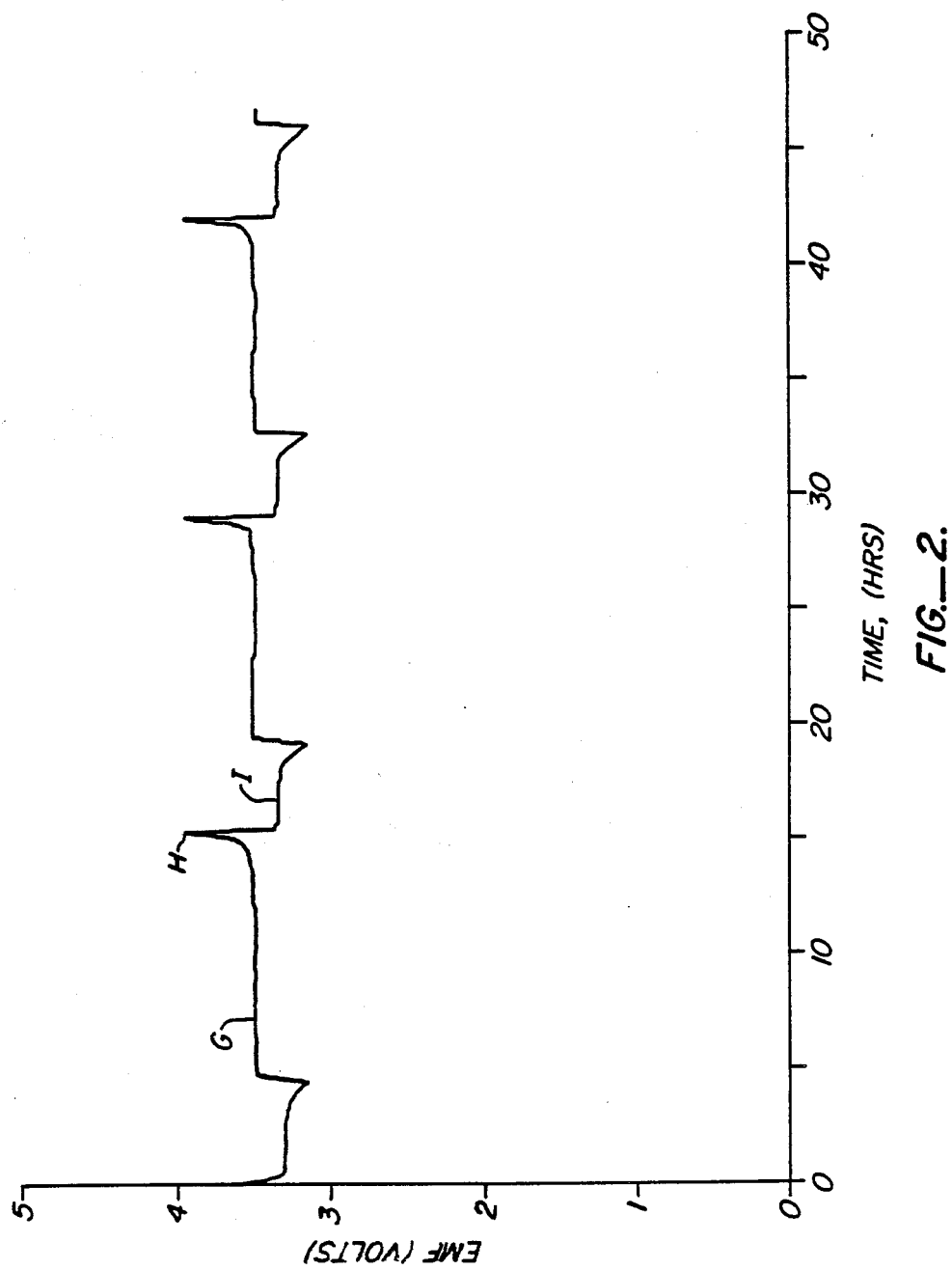
FIG._2.

ELECTROLYTE ADDITIVES TO IMPROVE VOLTAGE REGULATION IN THE LITHIUM-COPPER CHLORIDE RECHARGEABLE CELL

TECHNICAL FIELD OF THE INVENTION

The present invention involves an electrochemical cell employing lithium as an anode, lithium tetrachloroaluminate as an electrolyte, sulfur dioxide as a solvent, and a cathode of high surface area carbon black containing cupric chloride. It has been found that voltage regulation of such cells can be enhanced by the addition of an oxidizing agent to the electrolyte.

BACKGROUND OF THE INVENTION

Over the past several years, a class of cells commonly known as liquid cathode cells has emerged as the best candidate to provide substantially increased performance over he age-old zinc-carbon, alkaline and silver oxide cells. The liquid cathode cells are distinguished from more conventional cells in that the active cathode depolarizer is a liquid. The basic elements of the cell are an anode, typically consisting of an alkaline or alkaline earth metal, a current collector consisting of a high surface area material that is catalytically active in the reduction of the liquid cathode, a suitable separator located between the current collector and the anode and mechanically separating the two, and the electrolyte, which includes the liquid cathode as well as an ionically conductive solute dissolved in a liquid solvent. In certain type cells, the solvent performs the additional function of the active cathode depolarizer.

The liquid cathode cells that are most commonly discussed in the literature as having the best performance characteristics are those using lithium metal anodes and active cathode depolarizers that are either oxyhalides, such as thionyl chloride or sulfur dioxide. Sulfur dioxide has also been employed as the cell solvent, particularly in secondary or rechargeable cells of the type which are made the subject of the present invention.

Cells for contemplation herein employ a lithium anode and a solution of a highly soluble lithium salt as the electrolyte, such as lithium tetrachloroaluminate. Sulfur dioxide is used as the solvent, while the cathode is a high surface area carbon black containing cupric or copper II chloride.

Under ideal conditions, the cupric chloride contained within the porous carbon cathode discharges, displaying a single voltage plateau at approximately 3.4 V. There is, however, a tendency for the cupric chloride to decompose to cuprous chloride via the reaction:

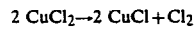

If impurity levels of copper I chloride are high, the cell displays additional voltage plateaus on charge and discharge. Typically, the above-referenced decomposition reaction results in between 2 and 10% cuprous chloride in the cathode, having the effect outlined above.

It is thus an object of the present invention to provide a rechargeable Li-SO2 cell having a cathode of porous carbon containing CuCl2 while minimizing the effects of CuCl contamination in the cathode.

This and further objects will be more fully appreciated when considering the following disclosure and appended drawings, wherein FIGS. 1 and 2 represent graphs of cell voltages during charge and discharge for the prior art as well as for cells produced according to the present invention.

SUMMARY OF THE INVENTION

The present invention is based upon the discovery that a lithium based non-aqueous cell employing liquid sulfur dioxide as the solvent and cupric chloride contained in a porous carbon body as the cathode will display a single voltage plateau if the impurity which normally occurs in the cathode as a result of the reduction of $Cu^{+2}$ is minimized or eliminated completely. This impurity results from the formation of cuprous chloride and chlorine from the cupric chloride cathode additive. The present invention is carried out by adding an oxidizing agent, which is a member selected from the group consisting of halogens such as $Cl_2$, $Br_2$, and oxyhalides such as $SOCL_2$ AND $SO_2Cl_2$ to the cell electrolyte. Ideally, these additives are employed in amounts between approximately 3 to 10% by weight based upon the weight of the electrolyte which is, for example, lithium tetrachloroaluminate dissolved in liquid sulfur dioxide.

DETAILED DESCRIPTION OF THE INVENTION

During the preparation of carbon-cupric chloride mixtures for use as the positive electrode of a secondary cell, some of the cupric chloride decomposes via the reaction

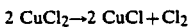

This results in a significant percentage of copper I chloride in the cathode generally measured to be between approximately 2 to 10% by weight as measured by titration. The effect of this contamination is to introduce an additional voltage plateau during the recharging process as shown in FIG. 1.

FIG. 1 represents the charge-discharge voltage curve of a spirally wound AA size cell which consisted of a 6 mil thick lithium anode and a 23 mil thick copper II chloride and carbon cathode. The two electrodes were separated by TEFZEL, which is a microporous membrane material of a tetrafluoroethylene fluorocarbon from Raychem Corp., which is capable of inhibiting the dendritic growth of lithium. Prior to winding the components the positive electrode was heated to 120° C. under vacuum to remove water. The cell was filled with an electrolyte consisting of lithium tetrachloroaluminate dissolved in liquid sulfur dioxide. The cell was cycled between 3.95 V and 3.15 V immediately after construction.

Turning to FIG. 1, at A, charging begins and a first plateau is reached at B. Without contamination, the voltage of the cell would remain constant until a peak at D is reached. Instead, a secondary plateau is established at C which is indicative of CuCl contamination in the cathode. Discharge then takes place which should result in the establishment of a secondary plateau at F. Instead, an elbow appears at E which again is indicative of cuprous chloride contamination. reaction

It has been discovered that a most convenient way to minimize or eliminate CuCl contamination is to add an oxidizing agent to the lithium tetrachloroaluminate electrolyte. Ideal oxidizing agents for this purpose are halides such as chlorine and bromine, and oxyhalides such as sulfuryl chloride and thionyl chloride which operate in the cell pursuant to one of the following reactions:

$$2 CuCl_2 + Cl \rightarrow 2 CuCl_2$$

$$2 CuCl + Br_2 \rightarrow CuCl_2 + CuBr$$

$$2 CuCl + SO_2Cl_2 \rightarrow 2 CuCl_2 + SO_2$$

Typically, 3 to 10% by weight of the oxidizing agent is added to the electrolyte with the results shown in FIG. 2. FIG. represents the charge-discharge profile of a similar AA size cell which contained electrolyte to which was added 5% by weight of sulfuryl chloride. As noted in FIG. 2, which is again a plot of EMF voltage of an "AA" cell, during the charge-discharge cycle, a first plateau is established during the charging of the cell at G. Once fully charged, a spike is achieved at H, at which time discharge occurs at I. Clearly, two distinct plateaus, one at charge and one at discharge, are evidenced. No secondary plateaus, such as shown in FIG. 1, are evident in producing a cell pursuant to the present invention.

We claim:

1. In an electrochemical power cell employing lithium as an anode, lithium tetrachloroaluminate as an electrolyte, sulfur dioxide as a solvent, and high surface carbon black containing cupric chloride as a cathode, the improvement comprising adding an oxidizing agent to the electrolyte.

2. The electrochemical cell of claim 1 wherein said oxidizing agent is a member selected from the group consisting of halogens such as $Cl_2$ and $Br_2$, and oxyhalides such as $SO_2Cl_2$ and $SOCl_2$.

3. The electrochemical cell of claim 1 wherein said oxidizing agent is present in an amount between approximately 3 to 5% by weight based upon the weight of said electrolyte.

4. A method of improving voltage regulation of an electrochemical cell employing lithium as an anode, lithium tetrachloroaluminate as an electrolyte, sulfur dioxide as a solvent, and high surface area carbon black containing cupric chloride as a cathode, said method comprising the addition of an oxidizing agent to the electrolyte.

5. The method of claim 4 wherein said oxidizing agent is a member selected from the group consisting of halides such as $Cl_2$ and $Br_2$, and oxyhalides such as $SO_2Cl_2$ and $SOCl_2$.

6. The method of claim 4 wherein said oxidizing agent is present in an amount between approximately 3 to 5% by weight based upon the weight of said electrolyte.

* * * * *